(12) United States Patent
Wu et al.

(10) Patent No.: US 10,521,440 B2
(45) Date of Patent: Dec. 31, 2019

(54) HIGH PERFORMANCE DATA PROFILER FOR BIG DATA

(71) Applicant: Aetna Inc., Hartford, CT (US)

(72) Inventors: Zhijun Wu, Durham, CT (US); Sanjeev Kumar Reddy Bollam, Hartford, CT (US); Daniel J. Markwat, Arlington, MA (US); Shyam Munjuluri, Unionville, CT (US)

(73) Assignee: Aetna Inc., Hartford, CT (US)

(*) Notice: Subject to any disclaimer, the term of this patent is extended or adjusted under 35 U.S.C. 154(b) by 184 days.

(21) Appl. No.: 15/666,101

(22) Filed: Aug. 1, 2017

(65) Prior Publication Data

US 2019/0266154 A1 Aug. 29, 2019

Related U.S. Application Data

(63) Continuation-in-part of application No. 15/599,173, filed on May 18, 2017.

(60) Provisional application No. 62/370,074, filed on Aug. 2, 2016.

(51) Int. Cl.
G06F 16/28 (2019.01)
G06F 16/2458 (2019.01)

(52) U.S. Cl.
CPC ........ *G06F 16/2465* (2019.01); *G06F 16/283* (2019.01)

(58) Field of Classification Search
CPC .................................. G06F 9/0561; G06F 7/18
See application file for complete search history.

(56) References Cited

U.S. PATENT DOCUMENTS

2017/0083384 A1* 3/2017 Stocker ..................... G06F 9/52

OTHER PUBLICATIONS

"Statistics With Spark," http://dev.bizo.com/2014/03/statistics-with-spark.html (Mar. 2014).
Yavuz, Burak and Xin, Reynold, "Statistical and Mathematical Functions with Data Frames in Apache Spark," https://databricks.com/blog/2015/06/02/statistical-and-mathematical-functions-with-dataframes-in-spark.html (Jun. 2, 2015).
Malaska, Ted, *Cloudera Engineering Blog*, "How-to: Do Data Quality Checks using Apache Spark Data Frames," http://blog.cloudera.com/blog/2015/07/how-to-do-data-quality-checks-using-apache-spark-dataframes/ (Jul. 9, 2015).
"Class DoubleRDDFunctions," https://spark.apache.org/docs/1.5.2/api/java/org/apache/spark/rdd/DoubleRDDFunctions.html (Accessed on Aug. 1, 2017).

(Continued)

*Primary Examiner* — Gary W. Cygiel
(74) *Attorney, Agent, or Firm* — Leydig, Voit & Mayer, Ltd.

(57) ABSTRACT

A method for profiling a dataset includes: querying, by a data profiler executed on a distributed computing system, a metadata storage to obtain table information; allocating, by the data profiler, system resources based on the obtained table information; profiling, by the data profiler, the dataset to obtain profiling results, wherein profiling the dataset includes shuffling and repartitioning data blocks of the dataset with respect to a plurality of nodes of the distributed computing system, and computing aggregates based on the shuffled and repartitioned data blocks; and outputting, by the data profiler, the profiling results.

19 Claims, 4 Drawing Sheets

(56) References Cited

OTHER PUBLICATIONS

Arbesser, Amelia, "Technology—A Taste of Spark: Profiling," https://www.trifacta.com/blog/a-taste-of-spark/ (Feb. 23, 2016).
"Scalable and Incremental Data Profiling with Spark," *Spark Summit 2016*, https://spark-summit.org/2016/events/scalable-and-incremental-data-profiling-with-spark/ (Jun. 7, 2016).
Nathan, Suren "Data Profiling and Pipeline, Processing with Spark," *Spark Summit East*, https://spark-summit.org/east-2016/events/data-profiling-and-pipeline-processing-with-spark/ (Feb. 18, 2016).
"Data Quality Analyzer," https://www.ataccama.com/products/dq-analyzer (Accessed on Aug. 1, 2017).
"Data Quality Analysis," https://www.talend.com/resource/data-quality-analysis.html (© 2017).

* cited by examiner

HIGH PERFORMANCE DATA PROFILER FOR BIG DATA

CROSS-REFERENCE TO RELATED APPLICATIONS

This patent application is a continuation-in-part of copending U.S. patent application Ser. No. 15/599,173, filed May 18, 2017. This patent application claims the benefit of U.S. Provisional Patent Application No. 62/370,074, filed Aug. 2, 2016. The foregoing patent applications are incorporated herein by reference in their entireties.

BACKGROUND

Profiling a large dataset is a difficult task and often takes very long time. Existing profiling tools take very long time (many hours or days) or fail to generate extensive statistic metrics on multi-terabyte tables.

Specifically, data profiling tools generating statistics on columns are currently available in relational database systems such as DB2, Oracle, etc. In the big data space, databases like Hadoop-based Hive do not maintain many of the statistics upfront. A user has to either create the custom solution to get the data statistics or use one of the commercial profiling tools in the marketplace to obtain the statistics on columns. Almost all existing big data profiling tools, with the exception of a few, use the traditional MapReduce approach to profile a large dataset from a Hadoop system, either directly using a MapReduce process or indirectly via a Hive/Pig query process. The MapReduce approach suffers the performance problem, and is especially problematic for computation intensive metrics such as histograms, topN values, etc. It either takes a very long time (hours or days) to complete, or outright fails to profile a multi-terabyte dataset with billions of rows and thousands of columns and trillions of values.

SUMMARY

In an exemplary embodiment, the present invention provides a method for profiling a dataset. The method includes: querying, by a data profiler executed on a distributed computing system, a metadata storage to obtain table information; allocating, by the data profiler, system resources based on the obtained table information; profiling, by the data profiler, the dataset to obtain profiling results, wherein profiling the dataset includes shuffling and repartitioning data blocks of the dataset with respect to a plurality of nodes of the distributed computing system, and computing aggregates based on the shuffled and repartitioned data blocks; and outputting, by the data profiler, the profiling results.

In another exemplary embodiment, the present invention provides a system for profiling a dataset. The system includes: an edge node, configured to query a metadata storage to obtain table information; allocate system resources of one or more clusters of nodes based on the obtained table information; communicate with the one or more clusters of nodes to profile the dataset to obtain profiling results; and output the profiling results; and the one or more clusters of nodes, each cluster of nodes comprising storage for data of the dataset and processors for performing the profiling of the dataset, wherein profiling the dataset includes shuffling and repartitioning data blocks of the dataset with respect to a plurality of nodes of the distributed computing system, and computing aggregates based on the shuffled and repartitioned data blocks.

In yet another exemplary embodiment, the present invention provides one or more non-transitory computer-readable mediums having processor-executable instructions stored thereon for profiling a dataset. The processor-executable instructions, when executed, facilitate performance of the following: querying a metadata storage to obtain table information; allocating system resources based on the obtained table information; profiling the dataset to obtain profiling results, wherein profiling the dataset includes shuffling and repartitioning data blocks of the dataset with respect to a plurality of nodes of the distributed computing system, and computing aggregates based on the shuffled and repartitioned data blocks; and outputting the profiling results.

DETAILED DESCRIPTION

Figure 1:
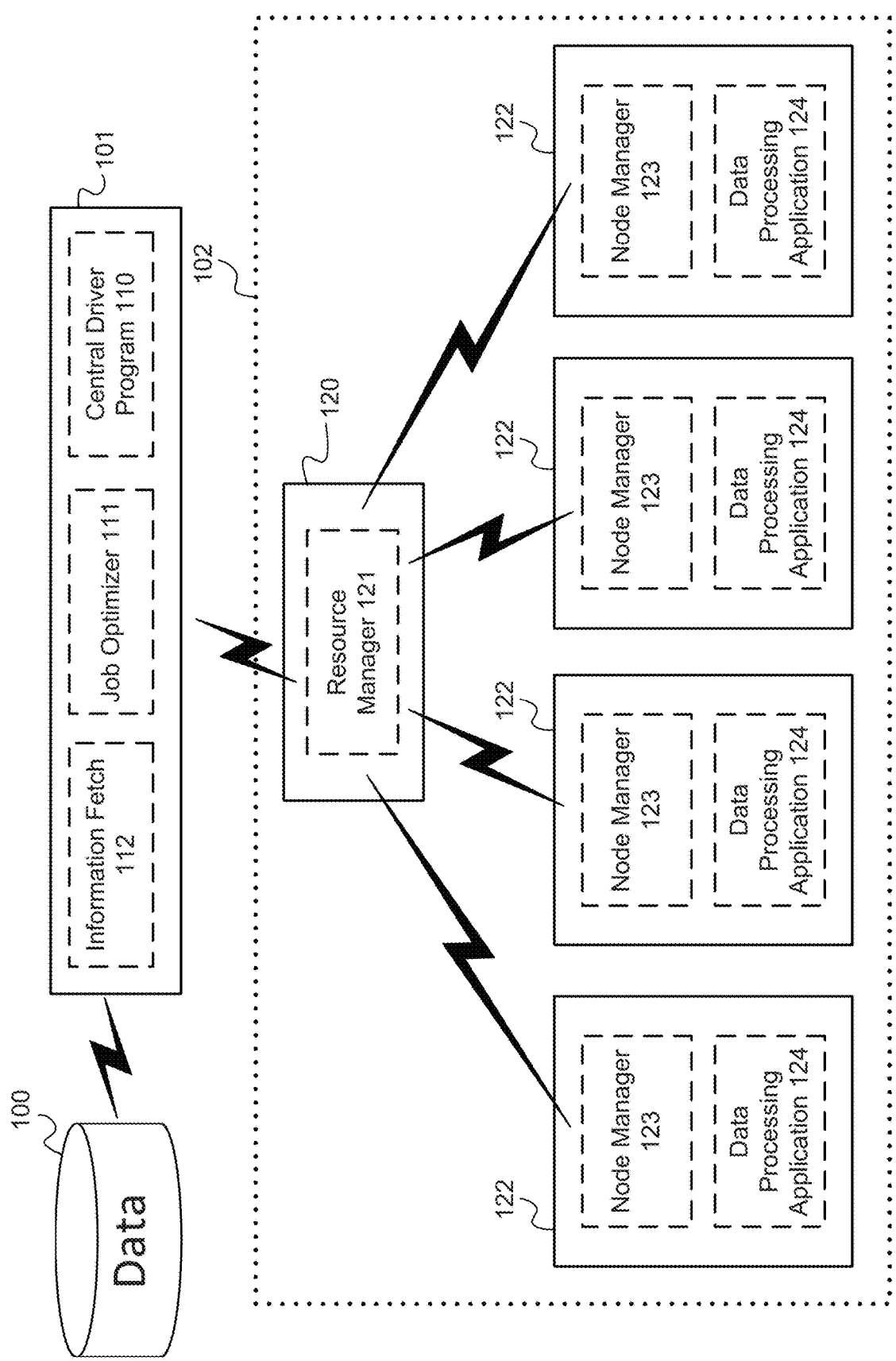
FIG. 1 is a block diagram illustrating an exemplary computing environment in which exemplary embodiments of the invention may be implemented.

Exemplary embodiments of the present invention provide for profiling large datasets and generating extensive aggregate statistics in big data applications. In an exemplary embodiment, the present invention leverages the Scala programming language, Apache Spark, and Apache Hive to generate aggregates such as nulls, average values, maximum values, minimum values, number of distinct values, histogram and topN values, monthly counts, annual counts, and other statistics of interest to data scientists and business users.

In an exemplary embodiment, a tool is provided which avoids the need for users to manually query each table with their own query and processing logic. The tool may provide, for example, a simple command-line interface for printing or otherwise outputting statistics via a terminal after queries have been completed, and allows for gathering multiple statistics simultaneously for very large datasets (e.g., billions of rows and thousands of columns, with trillions of values and many terabytes in size). The results may also be made available to a variety of end-user applications, for example, through a Scala application programming interface (API).

Exemplary embodiments of the invention may be applied in big data applications, as well as in other fields (e.g., feature engineering for machine learning, custom SQL logic, etc.).

The introduction of Apache Spark addressed some of the performance problems that MapReduce suffers from. The concept of DataFrame introduced in Apache Spark version 1.3 in March 2015 provides great support for structured and semi-structured data.

Although some efforts have been made to use Apache Spark to profile the big data in both the industrial and open source communities, only a few industrial companies have publicly disclosed their big data profiling tools using Apache Spark.

Synchronoss leverages Apache Spark to build a data profiling application which serves as a critical component in their overall framework for data pipelining But detailed performance benchmarks and the underlying technology has not been disclosed.

Data wrangler company Trifacta uses a MapReduce/Pig approach to profile the data, and in February 2016 added Spark as an alternative profiling engine. It saw an average of a 3× speed up for Spark. It gave one benchmark: under 15 minutes with Spark for a 10 GB dataset with 50 numerical and 50 categorical columns; almost an hour with MapReduce. No underlying technical detail was made available.

In the open source community, data statistic metrics in some forms can be generated using built-in Spark functions introduced in various Apache Spark releases.

Basic statistic functions like mean, total count, variance and histogram can be found for numeric data types in the built-in DoubleRDDFunctions class since Apache Spark 0.7.3. More advanced statistical methods can be found in Apache Spark's MLLib package. The built-in functions only work for a single numeric column, and only calculate a very limited number of metrics. They cannot obtain the statistics on all columns all at once.

Apache Spark 1.4 released in June 2015 enhanced the DataFrame statistics functionality. The Apache Spark DataFrame computes a small set of statistics such as count, mean, standard deviation, and minimum and maximum value for each numerical column. It does not have much for non-numerical columns such as date and character columns. Further, the number of metrics calculated for numerical column is small—for example, it does not have the number of unique values, null, topN values, etc. And, it also lacks the intelligence to re-partition data depending on size for faster computation.

Ted Malaska in Cloudera published a blog on Jul. 9, 2015, that describes a solution to evaluate data quality by retrieving 9 statistic metrics for every column in the dataset. This solution generates a few more metrics (such as the number of empty values, nulls, unique values and topN values) than what the Apache Spark DataFrame computes. It also handles two types of columns: String and Long. However, this solution does not provide histogram or date-related metrics such as aggregated count by month or by year, or string-length related metrics such average/max/min string length, etc. Further, the solution provided in the blog has many bugs as indicated by the responses to the blog. Most importantly, the solution does not scale and lacks the intelligence for improving efficiency. The solution cannot process a very large dataset with, for example, billions of rows, thousands of columns and tens of terabytes.

There are also data profiling tools that use an SQL-based approach, which generates the column statistics metrics via SQL query. The performance of SQL query is highly dependent on the query optimizer. Even with the help of Apache Spark DataFrame, which has one of the best big data query optimizers, the SQL-based approach is inefficient at computing many of the statistics metrics such as topN values and histograms because these column statistics have to be computed for each column one at a time. For a very wide dataset with thousands of columns, the SQL approach would take very long time, and for computationally intensive metrics like topN values and histogram, the SQL-based approach may not even be able to run to completion. It is thus very inefficient and oftentimes not possible to compute these statistics using big data variant of SQL—Apache Hive's Hive Query Language (HQL).

Exemplary embodiments of the invention are an improvement over the existing tools discussed above, and provide an end-to-end profiling tool that is able to rapidly profile a large dataset (e.g., multi-terabyte tables) in an automated and intelligent fashion, with over twenty statistical metrics being returned. The rapid profiling provided by these exemplary embodiments enables companies to identify potential data quality problems earlier, minimize risks arising from data quality issues, and take actions earlier in response to unexpected data profile changes. Further, by computing multiple or all metrics all at once, exemplary embodiments of the invention are able to be extremely effective on a large and/or wide dataset (e.g., performing hundreds and sometimes thousands of times faster than SQL-based big data profilers).

Exemplary embodiments of the invention may utilize, for example, Apache Spark DataFrame from Apache Spark version 1.3 or later, and provide a more efficient Apache Spark-based approach than conventional tools based on MapReduce, Hive or Pig, as well as conventional profiling tools that compute statistics metrics through an SQL engine. Exemplary embodiments of the invention may also leverage the Scala programming language.

As mentioned above, in an exemplary embodiment, a big data profiler computes multiple statistics metrics for columns in the dataset simultaneously. In an exemplary implementation, the core process flow includes starting with a Hadoop Distributed File System (HDFS) and performing flatMap, combine, shuffle, reduceByKey, map, and reduce operations. Exemplary embodiments of the invention further include several additional features that provide various capabilities and advantages that are not achieved by the existing solutions discussed above.

FIG. 1 is a block diagram illustrating an exemplary computing environment in which exemplary embodiments of the invention may be implemented. The exemplary computing environment of FIG. 1 includes a plurality of computing/data nodes, each node comprising at least one processor and at least one non-transitory computer-readable medium having processor-executable instructions stored thereon for performing functions corresponding to the node and/or having data of a table stored thereon. In this example, the nodes 122 are computing/data nodes (i.e., nodes that are utilized as both computing nodes and data nodes), but it will be appreciated that in other exemplary implementations, the computing functionality and the data storage functionality may be performed on computing nodes and data nodes that are separate.

A central driver program 110 is executed on an edge node 101, which for example, may be an Apache Hadoop edge node. The edge node 101 may further execute job optimizer 111 and information fetch 112 modules or applications. The edge node 101 may be connected to one or more clusters of nodes. By utilizing the one or more clusters of nodes, the central driver program 110 may implement "Spark Jobs" functionality, wherein the computing power of the one or more clusters of nodes are optimally utilized (based on optimization provided by the job optimizer 111 module or application) to profile a big dataset. The edge node 101 may further be in communication with a metadata database 100, which, for example, may correspond to a Hive Metastore.

One exemplary cluster 102 is shown in communication with the edge node 101. The cluster 102 may be, for example, an Apache Hadoop/Spark cluster using YARN as the cluster resource management system. The resource manager 121 of the cluster 102, executed on a resource manager node 120, may be, for example, a Hadoop built-in master service that allocates and manages the cluster resources, and that communicates with the central driver program 110 and the node managers 123 in a plurality of nodes 122. A fraction of a node's capacity (managed by the node manager 123) is allocated as a container that is used for running a data processing application 124 (so as to serve as a computing node). The data processing applications 124 may include, for example, respective Apache Spark applications executed on the respective nodes which facilitate repartitioning and shuffling of data. Further, the data processing applications 124 may be Apache Spark applications running on a YARN-based Hadoop cluster. The nodes 122 may also include storage regions for storing the data of a large dataset (so as to serve as a data node).

It will be appreciated that the exemplary environment shown in FIG. 1 is merely exemplary and for illustrative purposes, and that embodiments of the invention are not limited thereto. For example, in another exemplary embodiment, the various modules or applications of the edge node may be distributed across multiple nodes. In yet another exemplary embodiment, the central driver program may be connected to a plurality of nodes in a distributed database system such as Oracle, or other types of distributed file systems and data stores such as Amazon S3, or a distributed system in which data nodes and computing nodes are separated. Embodiments of the invention are also applicable to multi-threaded applications.

Figure 2:
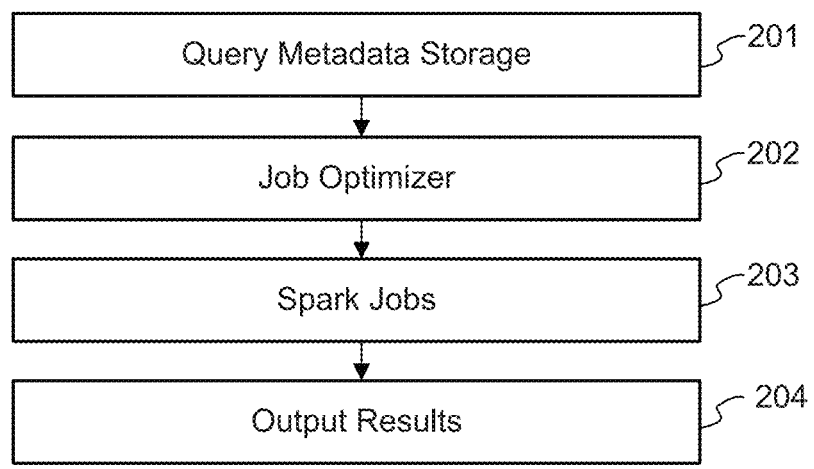
FIG. 2 is a flowchart illustrating an exemplary overall end-to-end flow for the big data profiler.

In an exemplary embodiment, the present invention provides an end-to-end product, a big data profiler, that is capable of processing a very large dataset in an automated manner triggered from a single table name as input. FIG. 2 is a flowchart illustrating an exemplary overall end-to-end flow for the big data profiler.

At stage 201, a metadata storage such as a Hive MetaStore is queried to fetch table information. For example, an information fetch 112 module or application of an edge node 101 communicates with a metadata database 100, and starting from the table name as a single input, relevant metadata information about the table (such as data size, number of HDFS blocks, HDFS block size and data location) is retrieved from the metadata database 100. Querying the metadata storage may be triggered, for example, by a file event such as a new trigger file created in a particular directory after a new dataset is loaded into a Hadoop HDFS file system.

At stage 202, a job optimizer (for example, job optimizer 111 executed by edge node 101) intelligently allocates system resources and performs optimization for the Spark Jobs operation so as to automatically adapt the implementation of the Spark Jobs for a specific dataset that is being profiled. Based on the retrieved table information from querying the metadata storage, the job optimizer determines a number of Spark configuration properties such as number of executors, executor cores, driver memory, driver cores, executor memory, level of parallelism, networking properties, etc. This step enables profiling jobs by automatically allocating proper levels of system resources across a wide range of data sizes. Without the job optimizer, system resources may be over-allocated such that system resources are wasted, or system resources may be under-allocated, leading to job failure or long execution time.

The intelligent optimization provided by the job optimizer facilitates successful profiling of a large dataset. With known information about the size of a Hadoop cluster, number of CPUs, available memory, and the information retrieved from the metadata storage such as data size, number of HDFS blocks, etc., the job optimizer appropriately calculates a number of parameters such as the number of executors, driver memory, executor memory, executor cores before the Spark profiling process begins. Inside the Spark profiling process, a large number of Spark properties are modified based on the job optimizer to enable the profiler to handle the large dataset. The following table shows an exemplary partial list of some Spark properties that may be modified:

| Properties Category | Properties Name |
| --- | --- |
| Application Properties | spark.driver.maxResultSize |
| Shuffle Behavior | spark.shuffle.memoryFraction |
|  | spark.shuffle.consolidateFiles |
| Compression and | spark.io.compression.codec |
| Serialization | spark.rdd.compress |
|  | spark.serializer |
| Networking | spark.akka.frameSize |
|  | spark.akka.heartbeat.interval |
|  | spark.akka.timeout |
|  | spark.rpc.askTimeout |
|  | spark.akka.threads |
| Scheduling | spark.speculation |
|  | spark.speculation.interval |

A few other parameters may be dynamically calculated based on the available information for a specific dataset as well. The number of partitions after a repartition/shuffle step and the depth of the hierarchical reducers are two such parameters. Having too few partitions would reduce the level of parallelism and increase the execution time, while having too many partitions would create too many small files and increase the communication cost and the execution time. The depth of hierarchical reducers helps to control the workload on any intermediate reducers. This avoids out-of-memory errors and increases the system throughput for a very large dataset (e.g., a dataset with tens of terabytes and hundreds of thousands of partitions).

Thus, the Query Metadata Storage and Job Optimizer steps at stages 201 and 202 are used to automatically and intelligently allocate system resources and optimize Spark Jobs, which are carried out at stage 203 via one or more clusters (such as cluster 102), to adapt to specific datasets. This ensures that a job has a proper level of resources to complete a profiling operation and also increases the overall throughput by avoiding over-allocation of resources.

At stage 204, the results are output by the central driver program. For example, the results may be displayed on a user device, saved to a computer storage, and/or made available via an application programming interface (API) for other applications. In one exemplary implementation, a Scala end-user API may be used to expose the results for other applications. In another exemplary implementation, all the statistical measures may be obtained at once through a simple command-line interface, with statistics printed or otherwise outputted to a terminal after completion. It will be appreciated that the results may be outputted according to a specified format.

Figure 3:
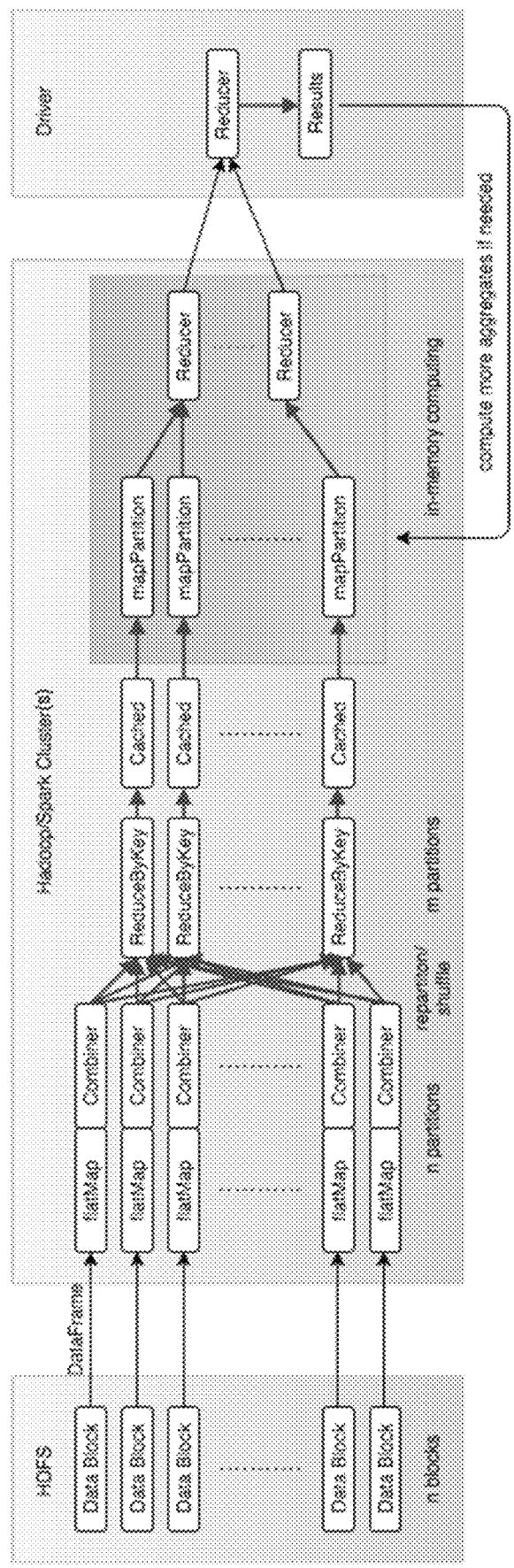
FIG. 3 is a flowchart illustrating a Spark Jobs operation in accordance with an exemplary embodiment.

FIG. 3 is a flowchart illustrating a Spark Jobs operation in accordance with an exemplary embodiment. As discussed above with respect to stage 203 of FIG. 2, the Spark Jobs workflow corresponds to operations performed after the Query Hive MetaStore and Job Optimizer steps. Within the Spark Jobs operation, unlike conventional data profiles, exemplary embodiments of the present invention provide for repartitioning the DataFrame, caching intermediate results, and using hierarchical reducers, as well as multiple rounds of in-memory aggregate computing (if needed). And, as will be discussed in further below, it will be appreciated that the flatMap and mapPartition steps within the Spark Jobs operation are also different from conventional profilers.

In the example shown in FIG. 3, data blocks of the HDFS form a DataFrame, corresponding to a data table, and the data blocks are loaded into respective memories of respective nodes of one or more Hadoop/Spark clusters. A flatMap, Combiner, and ReduceByKey process allows for the data of the DataFrame to be repartitioned and shuffled from n partitions corresponding to n blocks to m partitions. This process helps to control the execution parallelism. Otherwise, certain workloads may either take a very long time to complete or fail to complete.

The starting number of partitions, n, is based on the number of blocks that the table occupies. The ending number of partitions, m, is computed by the job optimizer based on several parameters: the starting number of partitions n, the number of executors and cores estimated by the job optimizer, the average data size per partition of the data table, and the desired CPU load factor. For example, a simplified, illustrative formula is m=(number of Executors*number of Cores*CPU Load Factor). The formula may further be modified to take into account a small average data size per partition and/or a very large number of starting partitions, as well as other considerations.

The flatMap operation includes transforming the rows of the table into key-value pairs, for example, in the format of ((column index, value), count). For a particular column specified by column index, any value will have an initial value count 1. The ensuing aggregating operations such as the Combiner and ReduceByKey operations can use the initial value count to get to an aggregated value count.

The Combiner operation includes aggregating the value counts of the same (column index, value) pairs within the same partition. The data is partially aggregated in the form of ((column index, value), aggregated count) before the data is shuffled into different nodes through the shuffle/repartition process.

The ReduceByKey operation includes aggregating the value count of the same (column index, value) pairs cross all the partitions of the dataset. The ending partition number m determined by the job optimizer is one of the input parameters of ReducerByKey operation. This operation involves shuffling and repartitioning data into the ending m partitions in the form of ((column index, value), total aggregated count).

Through these operations, the data (corresponding to the n partitions) may be shuffled, repartitioned, and aggregated into a number of new data blocks (corresponding to m partitions)—for example, by using the Apache Spark system as implemented across multiple computing nodes. In an exemplary embodiment, shuffling and repartitioning the data may causes a same value across all data blocks to be sent to a single data block to facilitate further aggregation.

Shuffling and repartitioning the data helps to avoid a skewed data distribution from the source data and potentially reduces usage of small files (which may cause inefficiencies), which allows for better balancing of the dataset across available nodes.

The repartitioned data is then cached in the memories of respective nodes of the cluster(s). The step to caching the intermediate data after the repartitioning enhances performance, because it is much faster to directly retrieve data from memory relative to retrieving it from disk storage or re-computing it (e.g., in the case of subsequent reading of intermediate data used to determine metrics that are not directly obtainable from the original data).

As a result of the Combiner, ReducebyKey and caching operations, aggregate key-value data is repartitioned according to the total available memory across executors, number of CPUs, CPU load factor, and an approximate amount of optimal partitions per GB of driver memory. The data is thus pre-aggregated by column index & value, summing the count of all occurrences using index-value as the key, and then cached in memories. Transforming and pre-aggregating rows into column index-value-count pairs makes subsequent aggregations (such as unique values) more efficient, allowing for efficient partitioning of data across multiple machines, if necessary. This also dedupes very large values (e.g., string or binary) so less memory is consumed. Even if all values are distinct there would be no more than n pairs.

After caching, the respective nodes each perform a mapPartition operation to obtain respective intermediate aggregates corresponding to the desired metrics. The mapPartition operation includes scanning the data (in the format of ((column index, value), count)) as the result of previous operations) and generating the intermediate aggregates on a per-partition basis. The intermediate aggregates are designed to correspond to the desired metrics such as count, sum, topN, etc.

The intermediate aggregates are then combined in intermediate reducers, for example, in accordance with the Spark Framework. The intermediate reducers may be implemented, for example, in computing nodes of the Hadoop/Spark cluster(s). The output of the intermediate reducers is then combined by a final reducer implemented by the central driver program on the edge node. The reducer operations may depend on the column type, the profiling metrics and the data structure of the intermediate aggregates. For certain metrics such as sum, the reducer operations include a simple addition of the corresponding metrics value in each intermediate aggregates. Some metrics such as annual count include aggregating the corresponding value based on a certain key such as year. Other metrics such as topN and median may include more sophisticated logic to merge data from multiple intermediate aggregates into one aggregate (e.g., as described in U.S. patent application Ser. No. 15/599,173, filed May 18, 2017). All reducer operations are executed in a distributed, parallel fashion.

As depicted in FIG. 3, hierarchical reducers (e.g., a treeReducer) may be used instead of a single reducer. By utilizing the intermediate reducers, the workload on the driver is decreased, facilitating efficient processing with respect to a large dataset. A single reducer may not be able to handle a large amount of data from a large dataset, but using hierarchical reducers spreads the workload to multiple intermediate reducers and allows the driver to more efficiently compute the final results. Thus, the driver does not need much memory even for a very large dataset.

It will be appreciated that the intermediate reducers may add a few seconds of processing time, but this is not much of a concern with respect to processing large datasets.

As further depicted in FIG. 3, multiple rounds of aggregate computing may be needed for certain aggregates, such as histogram, which depend on the results of other aggregates (e.g., min value, max value, etc.). Since the intermediate data is cached, the computing is all in-memory and is able to be performed very fast.

Aa result of the mapPartition and reducer operations, pre-aggregated key-value data is further aggregated by column index, with a defined set of aggregates being computed for each column. Each aggregate can be computed from the pairs of (index-value, count) as efficiently or more efficiently than without the initial aggregation. It will be appreciated that each aggregate may apply to fields of a set of corresponding types (e.g., determining a max value may apply to number fields but not string fields).

The results of the aggregation are cached in the driver, and if more aggregates are to be run, the process loops back through and performs further aggregation(s). For example, some aggregates, such as histogram, may rely on other aggregates, such as Min, Max values, and so these aggregates can be run after a first round of aggregates are run, using the cached results as part of their computations/derivations.

Figure 4:
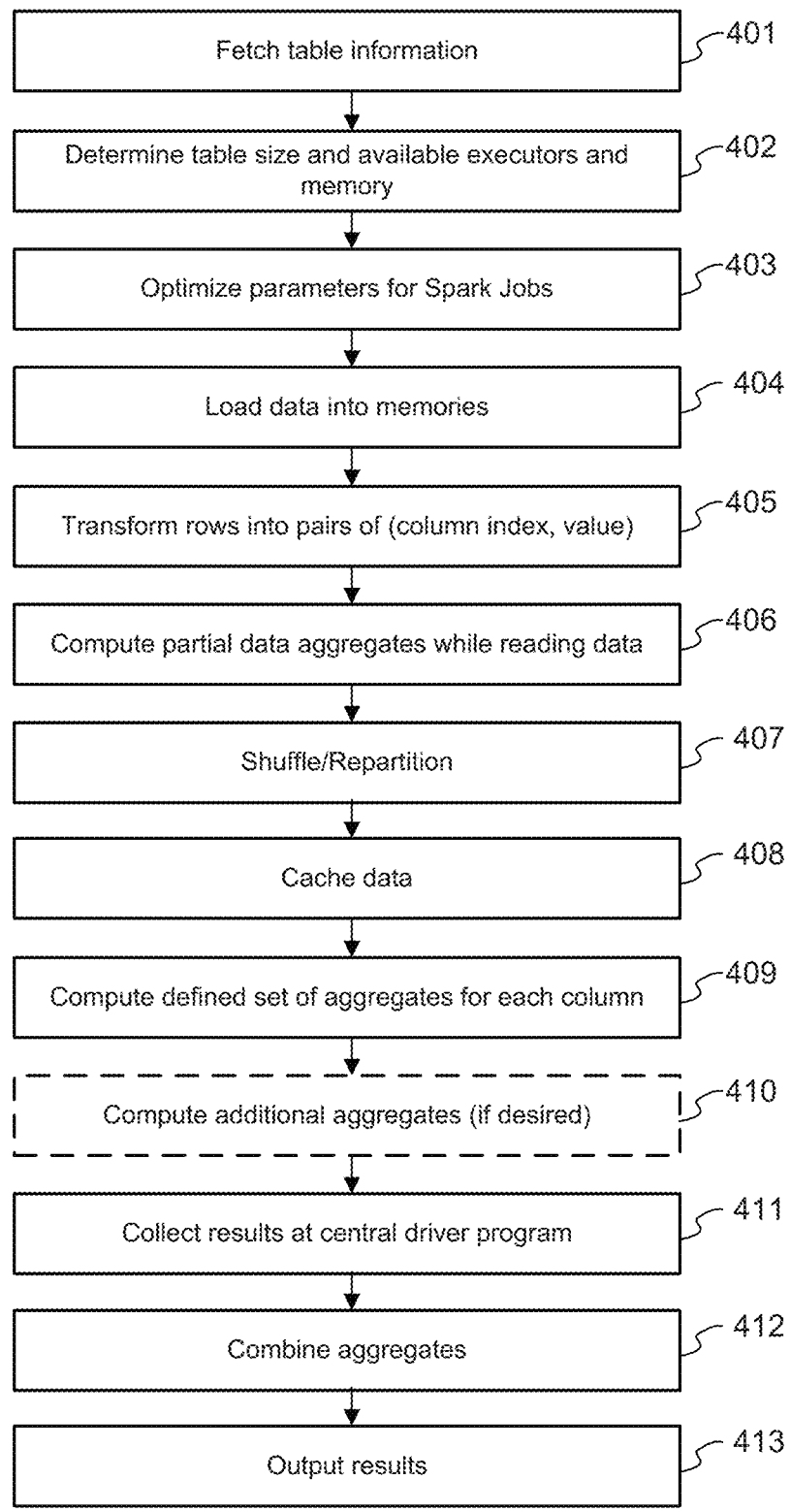
FIG. 4 is a flowchart illustrating an exemplary method for profiling a large dataset.

FIG. 4 is a flowchart illustrating an exemplary method for profiling a large dataset. In the example depicted in FIG. 4, the exemplary method is a scalable and efficient method for gathering aggregate statistics on a per-column basis for a table managed by Apache Hive. The process depicted in FIG. 4 is similar to the process depicted in FIG. 2, but additional exemplary details are provided in FIG. 4.

At stage 401, table information is fetched. For example, an edge node queries a Hive MetaStore to obtain table information regarding a Hive table.

At stages 402 and 403, a job optimizer determines the table size and the amount of available executors and memory, and based thereon, optimizes parameters for the Spark Jobs process. The optimized parameters include, for example, the number of partitions for the repartitioning step at stage 407, the number of executors, executor cores, driver memory, executor memory, the level of parallelism, networking properties, etc.

Stages 404 through 412 correspond to the Spark Jobs process. At stage 404, the data blocks of the Hive table are loaded into memories of respective computing nodes using Apache Spark. At stage 405, the rows of the data blocks are transformed into pairs of (column index, value). At stage 406, partial data aggregates are computed by the respective computing nodes while reading the data. At stage 407, the data is then shuffled and repartitioned into a number of nodes, wherein the number of nodes after repartitioning was determined at stage 403. At stage 408, the data after shuffling and repartitioning is cached into the memories of the respective nodes. At stage 409, the respective nodes compute a defined set of aggregates and/or intermediate aggregates for each column, and the results are collected at the central driver program at stage 411 (via a single reducer or via hierarchical reducers). To the extent there are any additional aggregates to run (e.g., aggregates that are based on intermediate aggregates), those aggregates may also be computed at stage 410 and are also collected at the central driver program at stage 411 (via a single reducer or via hierarchical reducers). At stage 412, the central driver program aggregates the collected intermediate aggregates to obtain the final desired metrics.

At stage 413, the final results of the profiling are output. For example, the results may be printed or displayed on a user's console, and/or sent further downstream for storage and/or analysis.

To provide a simplified, illustrative example of the job optimizer operation, consider a computing system having 200 nodes, 5000 cores, 40 TB memory available and 128 MB HDFS block size, and a dataset that is a 1.3 TB table having 2 billion rows and 200 columns Based on the number of nodes, cores and memory available, and the size of the table, the job optimizer determines 400 executors (which is roughly twice of the number of nodes), 5 cores/executor, 1000 partitions (400 executors×5 cores/executor×0.5 CPU load factor) with CPU load factor of 0.5, 8 GB driver memory and 4 GB executor memory, etc.

To provide a simplified, illustrative example of the Spark Jobs operation, consider the following exemplary table having 6 rows and 3 columns (the column names Col_0, Col_1, Col_2 in the heading is not considered as a part of the data):

| Col_0 | Col_1 | Col_2 |
|-------|-------|----------|
| 100 | ABC | $100.00 |
| 100 | DEF | $50.00 |
| 100 | ABC | $100.00 |
| 100 | DEF | $50.00 |
| 100 | ABC | $100.00 |
| 100 | DEF | $50.00 |

Given a simple case with three computing nodes, assume that the first two rows are loaded into the memory of a first node, the middle two rows are loaded into the memory of a second node, and the last two rows are loaded into the memory of a third node.

A flatMap process transforms each row of the table into the format of ((column index, value), count) where the initial value of count is 1.

Thus, the first computing node contains the following ((column index, value), count) entries:
((0, 100), 1), ((1, ABC), 1), ((2, $100.00), 1) from data row #1
((0, 100), 1), ((1, DEF), 1), ((2, S50.00), 1) from data row #2;
the second computing node contains the following ((column index, value), count) entries:
((0, 100), 1), ((1, ABC), 1), ((2, $100.00), 1) from data row #3
((0, 100), 1), ((1, DEF), 1), ((2, S50.00), 1) from data row #4; and
the third computing node contains the following ((column index, value), count) entries:
((0, 100), 1), ((1, ABC), 1), ((2, $100.00), 1) from data row #5
((0, 100), 1), ((1, DEF), 1), ((2, S50.00), 1) from data row #6.

The Combiner computes partial data aggregates at each node.

Thus, the first computing node contains the following ((column index, value), count) entries:
((0, 100), 2), ((1, ABC), 1), ((1, DEF), 1), ((2, $100.00), 1), ((2, $50.00), 1);
the second computing node contains the following ((column index, value), count) entries:
((0, 100), 2), ((1, ABC), 1), ((1, DEF), 1), ((2, $100.00), 1), ((2, $50.00), 1); and
the third computing node contains the following ((column index, value), count) entries: ((0, 100), 2), ((1, ABC), 1), ((1, DEF), 1), ((2, $100.00), 1), ((2, $50.00), 1)

After shuffling and repartitioning the data from the ReduceByKey operation, the data may, for example, be repartitioned onto two computing nodes as follows:
the first computing node contains the following ((column index, value), count) entries:
((0, 100), 6), ((1, ABC), 3), ((1, DEF), 3); and
the second computing node contains the following ((column index, value), count) entries:
((2, $100.00), 3), ((2, $50.00), 3).

This data is cached on the first and second computing nodes, and a defined set of aggregates is computed for each column through mapPartition and reducer operations. For example, for Col_0, the following aggregated data includes a max value (100), a min value (100), an average (100), a number of distinct values (1), a number of nulls (0), a number of empties (0), a sum (600), a number of values (6), and a count frequency (100, 6).

In further exemplary embodiments, the distributed computing techniques discussed herein may be used to provide a generic profiler that computes aggregated statistics not only by record count but also by business measures such as paid amount, revenue, profit/loss, etc. The computed aggregates by business measures may then be used in feature engineering for machine learning and in computing aggregated SQL logic (such as complex grouping on a very large table). One example is to generate hundreds of aggregated statistics on hundreds of features for a machine learning model that otherwise would take a very long time using a traditional SQL query based approach. Generating the aggregated statistics on business measures may be similar to the "Group By" logic in SQL query. In a broader sense, the generic profiler provided in further exemplary embodiments may be used as a basis to efficiently compute complex SQL logic that sometimes the SQL engine would not be able to handle. One such use case is to use the generic profiler to avoid the Cartesian join of a very large table. This may be achieved by expanding the flatMap step to handle more generic cases—e.g., to calculate aggregates not only by record count, but also based on business measures such as paid amount, revenue, profit/loss etc. For example, consider the exemplary table used above:

| Col_0 | Col_1 | Col_2 |
|-------|-------|----------|
| 100 | ABC | $100.00 |
| 100 | DEF | $50.00 |
| 100 | ABC | $100.00 |
| 100 | DEF | $50.00 |
| 100 | ABC | $100.00 |
| 100 | DEF | $50.00 |

The flatMap operation followed by ReduceByKey operation may output, for example, the following ((column index, value), count) entries: ((0, 100), 6), ((1, ABC), 3), ((1, DEF), 3), ((2, $100.00), 3), ((2, $50.00), 3). However, if the generic profiler is configured to further aggregate data by a business measure such as a paid amount (Col_2), the flatMap operation followed by ReduceByKey operation may further output the following ((column index, value), paid amount) entries: ((0, 100), $450.00), ((1, ABC), $300.00), ((1, DEF), $150.00), ((2, $100.00), $300.00), ((2, $50.00), $150.00). In other exemplary implementations, other custom logic may be utilized for aggregating the data based on other measures. Accordingly, by utilizing measures other than count for aggregation, the dataset may be analyzed from other perspectives, and in a manner that reduces computational complexity and intensity, thus decreasing the overhead on the servers and providing more free time for other business critical applications to run.

It will be appreciated that exemplary embodiments of the invention are able to efficient profile a large dataset to output a plurality of metrics (e.g., up to 22 metrics), as well as handling multiple profiling jobs concurrently. Even with a modest setup with respect to computing power, a server in accordance with an exemplary embodiment of the invention can handle 10 to 20 concurrent profiling jobs depending on data sizes. These operations may be performed on all the data types from, for example, a Hive database.

In an exemplary embodiment, the big data profiler is able to output up to 22 metrics, including certain computationally intensive metrics such as a histogram for all numeric columns, and aggregated count by month and by year for all date/timestamp columns. While some conventional approaches may return only 9 metrics, such as nulls, empties, total count, unique values, max, min, sum, average, topN values, the big data profiler according to exemplary embodiments of the invention is able to return 13 additional metrics on top of those 9 metrics, including, for example, min string length, max string length, average string length, min date, max date, min timestamp, max timestamp, histogram (decile frequency), annual count, monthly count, total data size in bytes, # of HDFS blocks or partitions, and file location url. In a further exemplary embodiment, and as discussed in further detail in U.S. patent application Ser. No. 15/599,173, filed May 18, 2017, the big data profiler is also able to determine other additional metrics, such as median or other quantiles, through an iterative histogram-building process.

Exemplary embodiments of the invention are able to handle all data types of a Hive database, including all Numeric types (tinyint, smallint, int, bigint, float, double, decimal), Date/Time types (timestamp, date), String types (String, varchar, char), and Boolean and binary type.

The big data profiler according to exemplary embodiments of the invention may be implemented as a fully automated and integrated product that can start from a trigger, retrieve the relevant information from Hive MetaStore, determine the proper Spark configuration properties via intelligent processing, identify all the columns and data types in the dataset, compute the statistics metrics for all the columns all at once, and output the results (e.g., display and/or save the results, and/or expose an API for other applications to consume the results).

Further, the big data profiler utilizes a highly scalable and efficient approach that is scalable both vertically (data size) and horizontally (number of jobs), and can compute extensive statistics metrics on all columns in a much shorter time than any known product in the marketplace. In exemplary implementations, it has been demonstrated that the big data profiler is able to profile 13 terabytes data with over 780 columns in less than 13 minutes, and can process 10 to 20 concurrent profiling jobs in a moderately built server. The intelligent job optimizer optimizes the profiling process to the extent that the overall execution time is predominately determined by disk I/O (reading the data from disk) time, not by computation time (even with all the computation intensive metrics such as topN values and histogram, etc.). Thus, the performance benchmark of the big data profiler is at least tens if not hundreds or thousands times better than benchmarks of certain existing products.

Features of the big data profiler that enable this scalability and efficiency to be achieved include: optimizing the use of system resources via the job optimizer, utilization of execution parallelism based on the input data, caching the intermediate data, and using hierarchical reducers.

It will be appreciated that although the foregoing description specifically mentions up to 22 metrics being outputted by the big data profiler, many other metrics such as standard deviation, variance, skewness, kurtosis, etc. may be efficiently calculated via multi-round in-memory aggregate computing in other exemplary embodiments of the invention.

It will further be appreciated that although the description above specifically mentions Hive tables, Hive tables are merely used as examples. Exemplary embodiments of the invention are not limited to Hive tables and may be used to profile any data source that the Apache Spark DataFrame can use as input source, including, for example, HBase, Cassandra, etc., as well as traditional relational databases.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for profiling a dataset, comprising:
    querying, by a data profiler executed on a distributed computing system, a metadata storage to obtain table information of the dataset, wherein the dataset comprises n number of blocks;
    allocating, by the data profiler, system resources based on the obtained table information;
    profiling, by the data profiler, the dataset to obtain profiling metrics, wherein profiling the dataset includes:
        determining, for the n blocks, partially aggregated value counts on a per-block basis, wherein each partially aggregated value count indicates a number of times a respective value appears in a respective column of the dataset for a respective block;
        determining totally aggregated value counts for the dataset based on the partially aggregated value counts, wherein each totally aggregated value count indicates a number of times a respective value appears in a respective column of the dataset for the dataset;
        repartitioning the totally aggregated value counts into m number of partitions; and
        computing the profiling metrics based on: computing, in parallel, m number of intermediate aggregates on a per-partition basis, and combining the intermediate aggregates through a hierarchy of reducers; and
    outputting, by the data profiler, the profiling metrics.

2. The method according to claim 1, wherein allocating the system resources is further based on a cluster size, a number of processors, available memory, a total size of the dataset, and the number of blocks in the distributed computing system.

3. The method according to claim 1, wherein profiling the dataset further includes:
    prior to computing the profiling metrics, caching the totally aggregated value counts onto a plurality of memories of the distributed computing system.

4. The method according to claim 1, wherein a depth of the hierarchy of reducers used for combining the intermediate aggregates is determined based on information regarding the dataset.

5. The method according to claim 1, wherein outputting the profiling metrics includes causing the profiling metrics to be displayed, printed, or made available via an application programming interface (API).

6. The method according to claim 1, further comprising:
    determining the number m for repartitioning based on the number n, an estimated number of executors and cores, an average data size per partition of the data table, and a central processing unit (CPU) load factor.

7. The method according to claim 1, wherein the profiling metrics include nulls, empties, total count, unique values, max, min, sum, average, and/or topN values.

8. The method according to claim 1, wherein the profiling metrics include min string length, max string length, average string length, min date, max date, min timestamp, max timestamp, decile frequency, annual count, monthly count, total data size in bytes, number of blocks or partitions, and/or file location url.

9. The method according to claim 1, wherein the dataset includes entries of at least one of the following types: tinyint, smallint, int, bigint, float, double, decimal, timestamp, date, String, varchar, char, Boolean, and/or binary.

10. A system for profiling a dataset, comprising:
    an edge node; and
    one or more clusters of nodes;
    wherein the edge node is configured to:
        query a metadata storage to obtain table information of the dataset, wherein the dataset comprises n number of blocks;
        allocate system resources of the one or more clusters of nodes based on the obtained table information;
        communicate with the one or more clusters of nodes to profile the dataset to obtain profiling metrics; and
        output the profiling metrics; and
    wherein each cluster of nodes comprises storage for data of the dataset and processors for performing the profiling of the dataset;
    wherein profiling the dataset includes:
        determining, for the n blocks, partially aggregated value counts on a per-block basis, wherein each partially aggregated value count indicates a number of times a respective value appears in a respective column of the dataset for a respective block;

determining totally aggregated value counts for the dataset based on the partially aggregated value counts, wherein each totally aggregated value count indicates a number of times a respective value appears in a respective column of the dataset for the dataset;

repartitioning the totally aggregated value counts into m number of partitions; and computing the profiling metrics based on: computing, in parallel, m number of intermediate aggregates on a per-partition basis, and combining the intermediate aggregates through a hierarchy of reducers.

11. The system according to claim 10, wherein allocating the system resources is further based on a cluster size, a number of processors, available memory, a total size of the dataset, and the number of blocks in the distributed computing system.

12. The system according to claim 10, wherein profiling the dataset further includes:

prior to computing the profiling metrics, caching the totally aggregated value counts onto a plurality of memories of the one or more clusters of nodes.

13. The system according to claim 10, wherein a depth of the hierarchy of reducers used for combining the intermediate aggregates is determined based on information regarding the dataset.

14. The system according to claim 10, wherein outputting the profiling metrics includes causing the profiling metrics to be displayed, printed, or made available via an application programming interface (API).

15. One or more non-transitory computer-readable mediums of a distributed computing system, the one or more non-transitory computer-readable mediums having processor-executable instructions stored thereon for profiling a dataset, the processor-executable instructions, when executed, facilitating performance of the following:

querying a metadata storage to obtain table information of the dataset, wherein the dataset comprises n number of blocks;

allocating system resources based on the obtained table information;

profiling the dataset to obtain profiling metrics, wherein profiling the dataset includes:

determining, for the n blocks, partially aggregated value counts on a per-block basis, wherein each partially aggregated value count indicates a number of times a respective value appears in a respective column of the dataset for a respective block;

determining totally aggregated value counts for the dataset based on the partially aggregated value counts, wherein each totally aggregated value count indicates a number of times a respective value appears in a respective column of the dataset for the dataset;

repartitioning the totally aggregated value counts into m number of partitions; and computing the profiling metrics based on: computing, in parallel, m number of intermediate aggregates on a per-partition basis, and combining the intermediate aggregates through a hierarchy of reducers; and outputting the profiling metrics.

16. The one or more non-transitory computer-readable mediums according to claim 15, wherein allocating the system resources is further based on a cluster size, a number of processors, available memory, a total size of the dataset, and the number of blocks in the distributed computing system.

17. The one or more non-transitory computer-readable mediums according to claim 15, wherein profiling the dataset further includes:

prior to computing the profiling metrics, caching the totally aggregated value counts onto a plurality of memories of the distributed computing system.

18. The one or more non-transitory computer-readable mediums according to claim 15, wherein a depth of the hierarchy of reducers used for combining the intermediate aggregates is determined based on information regarding the dataset.

19. The one or more non-transitory computer-readable mediums according to claim 15, wherein outputting the profiling metrics includes causing the profiling metrics to be displayed, printed, or made available via an application programming interface (API).

* * * * *